United States Patent
Kaneko et al.

(10) Patent No.: US 10,508,687 B2
(45) Date of Patent: Dec. 17, 2019

(54) PIVOT ASSEMBLY BEARING DEVICE

(71) Applicant: MINEBEA MITSUMI INC., Kitasaku-gun, Nagano (JP)

(72) Inventors: Atsushi Kaneko, Nagano (JP); Shinya Ohnuma, Ibaraki (JP); Kunihiro Tsuchiya, Gumma (JP)

(73) Assignee: Minebea Mitsumi Inc., Nagano (JP)

( * ) Notice: Subject to any disclaimer, the term of this patent is extended or adjusted under 35 U.S.C. 154(b) by 0 days.

(21) Appl. No.: 16/196,690

(22) Filed: Nov. 20, 2018

(65) Prior Publication Data

US 2019/0162235 A1    May 30, 2019

(30) Foreign Application Priority Data

Nov. 24, 2017 (JP) ................................ 2017-225992

(51) Int. Cl.
| | |
|---|---|
| *F16C 33/66* | (2006.01) |
| *F16C 33/78* | (2006.01) |
| *F16C 35/06* | (2006.01) |
| *F16C 33/80* | (2006.01) |

(52) U.S. Cl.
CPC ...... *F16C 33/6607* (2013.01); *F16C 33/7823* (2013.01); *F16C 33/80* (2013.01); *F16C 35/06* (2013.01); *F16C 2370/12* (2013.01)

(58) Field of Classification Search
CPC ...... F16C 19/54; F16C 19/33; F16C 19/6603; F16C 19/6607; F16C 19/6614; F16C 19/6629; F16C 19/6637; F16C 19/664; F16C 19/6651; F16C 19/6681; F16C 19/7816; F16C 19/782; F16C 19/7823; F16C 19/7826; F16C 19/7886; F16C 19/7896; F16C 2370/12

See application file for complete search history.

(56) References Cited

U.S. PATENT DOCUMENTS

| | | | | |
|---|---|---|---|---|
| 8,967,875 | B2 * | 3/2015 | Rychahivskyy | ........ F16C 33/32 384/492 |
| 2014/0363112 | A1 * | 12/2014 | Sugita | ..................... C22C 38/02 384/462 |
| 2015/0043852 | A1 * | 2/2015 | Adane | ................... F16C 33/588 384/473 |

FOREIGN PATENT DOCUMENTS

| | | | |
|---|---|---|---|
| JP | H11-062972 A | 3/1999 | |
| JP | H11-190353 A | 7/1999 | |
| JP | 2010180971 A * | 8/2010 | ............ F16C 33/664 |
| JP | 2010190390 A * | 9/2010 | |

* cited by examiner

*Primary Examiner* — Phillip A Johnson
(74) *Attorney, Agent, or Firm* — Carrier Blackman & Associates, P.C.; Joseph P. Carrier; William D. Blackman (57) ABSTRACT

A pivot assembly bearing device includes a shaft having an outer peripheral surface and a rolling bearing fixed to the shaft. An annular sealing surface axially overlapping with at least a part of an end surface of the rolling bearing is provided on an axially outer side of the rolling bearing. An oil-repellent film is annularly formed on at least one of the sealing surface and a part of the outer peripheral surface of the shaft located axially outward from the rolling bearing.

9 Claims, 9 Drawing Sheets

PIVOT ASSEMBLY BEARING DEVICE

CROSS-REFERENCE TO RELATED APPLICATIONS

This application claims priority from Japanese Patent Application No. 2017-225992 filed on Nov. 24, 2017, the entire contents of which are incorporated herein by reference.

TECHNICAL FIELD

The disclosure relates to a pivot assembly bearing device used for a swing arm or the like of a hard disk drive.

BACKGROUND

A pivot assembly bearing device used for a swing arm of a hard disk drive (HDD) is normally configured by inserting a pair of rolling bearings into a shaft. Grease is enclosed in these rolling bearings. Grease is lubricant made into semi-solid form by mixing base oil and thickener. As the grease for the pivot assembly bearing device, for example, urea-based grease containing hydrocarbon-based base oil such as polyalphaolefin or mineral oil and diurea compound as thickener can be used. Recently, in order to maintain superiority to a solid state drive (SSD), the HDD is getting larger in capacity, and higher densification is required. Therefore, a gap between a magnetic head and a magnetic disk is further reduced as compared with the prior art, and the adhesion of oil to a head part of the HDD is becoming a problem. It is considered that the adhesion of oil is caused by the base oil of the grease enclosed in the rolling bearing of the pivot assembly bearing device being oozed out to the outside through a metal surface. Accordingly, there is a demand for a pivot assembly bearing device capable of suppressing the oozing of the base oil of the grease to the outside. Many such inventions have been made.

For example, JP-A-H11-062972 discloses a rolling bearing for swinging motion as a rolling bearing for supporting an actuator of an HDD. In this rolling bearing, balls are disposed between an inner ring and an outer ring, a shield attached to the outer ring faces a sealing surface (outer peripheral surface) of the inner ring, lubricant is put into the bearing internal space defined by the outer ring, the inner ring and the shield, and oil-repellent agent is applied to the sealing surface and the surface (an inner diameter side end surface of the shield) of the shield facing the sealing surface. In this manner, even when grease is used as lubricant inside the bearing, the grease is repelled by the oil-repellent agent and does not ooze out of the bearing.

On the other hand, JP-A-H11-190353 discloses a rolling bearing device for a swing arm. In this rolling bearing device, lubricant is applied to a raceway surface of a rolling bearing, an inner ring and an outer ring of the rolling bearing are press-fitted respectively to an outer side surface of a shaft and an inner side surface of a housing, and oil-repellent agent is applied to an inner peripheral surface of an end portion of the housing. With this oil-repellent agent, lubricant oozing out from a gap between the inner ring and a seal of the rolling bearing and a small gap in a fixing portion of the seal and the outer ring is repelled by the oil-repellent agent, so that the leakage of the lubricant from the bearing device to the outside can be suppressed.

Here, in the pivot assembly bearing device as described above, the oil-repellent agent is applied to the inner ring and the shield (sealing plate) of the rolling bearing and the inner surface of the end portion of the housing incorporating the rolling bearing. However, it is difficult to apply the oil-repellent agent to the inner ring and the sealing plate of the extremely small ball bearing as used for the pivot assembly bearing device. That is, since the oil-repellent agent has low viscosity, it is likely to spread beyond the application region after applied and before it is dried to form the oil-repellent film. Therefore, it is difficult to form the oil-repellent film having an extremely small width on the inner diameter side end surface of the sealing plate and the outer peripheral surface of the inner ring of the extremely small ball bearing because the dimensions of the parts are small. Also, the oil-repellent film formed on the inner diameter side end surface of the sealing plate and the outer peripheral surface of the inner ring is easily peeled off. Therefore, even when the oil-repellent film is formed at the stage where the ball bearing has not assembled yet, there is a possibility that the oil-repellent film may be partially peeled off by rubbing against another member when assembling the ball bearing. Then, not only the failure of the oil-repellent film occurs, but also the oil-repellent film that is peeled off contaminates the inside of the bearing, which adversely affects the performance of the ball bearing. For these reasons, the pivot assembly bearing device in which the oil-repellent agent is applied to the rolling bearing has not been put to practical use.

On the other hand, it is also difficult to form the oil-repellent film by applying oil-repellent agent on the inner peripheral surface of the end portion of the housing to which the rolling bearing is fixed. That is, when the oil-repellent film is formed before the rolling bearing is assembled to the housing, the oil-repellent film and the outer peripheral surface of the rolling bearing rub against each other at the time of assembling the rolling bearing, and the oil-repellent film is peeled off. Further, after the rolling bearing is fixed to the housing, the low-viscosity oil-repellent agent may drip and enter the bearing or may adhere to the outer peripheral surface of the housing. The oil-repellent agent penetrated and dried in the bearing is a foreign matter and contaminates the rolling bearing. Also, the oil-repellent agent adhered and dried on the outer peripheral surface of the housing may cause poor adhesion when fixing the housing to the swing arm by an adhesive.

SUMMARY

The disclosure aims to provide a pivot assembly bearing device capable to suppress the oozing of grease to the outside and easy to be manufactured.

An aspect of the present disclosure provides a pivot assembly bearing device including a shaft having an outer peripheral surface and a rolling bearing fixed to the shaft in which an annular sealing surface axially overlapping with at least a part of an end surface of the rolling bearing is provided on an axially outer side of the rolling bearing, and an oil-repellent film is annularly formed on at least one of the sealing surface and a part of the outer peripheral surface of the shaft located axially outward from the rolling bearing.

BRIEF DESCRIPTION OF DRAWINGS

FIGS. 3A and 3B show a modification of the pivot assembly bearing device according to the first embodiment of the disclosure.

DETAILED DESCRIPTION

Hereinafter, embodiments for carrying out the disclosure will be described with reference to the accompanying drawings. Throughout the drawings, the same or the corresponding portions are denoted by the same reference numerals. Further, an example where a ball bearing is used as a rolling bearing is shown. In the following description, in the case where the positional relationship and orientation are described using "up," "down," "left," and "right," these indicate the directions and orientation in the drawings. Further, "axial direction" is a direction parallel to the rotation axis of the rolling bearing, and "diametrical direction" or "radial direction" is the direction perpendicular to the rotation axis.

Figure 1:
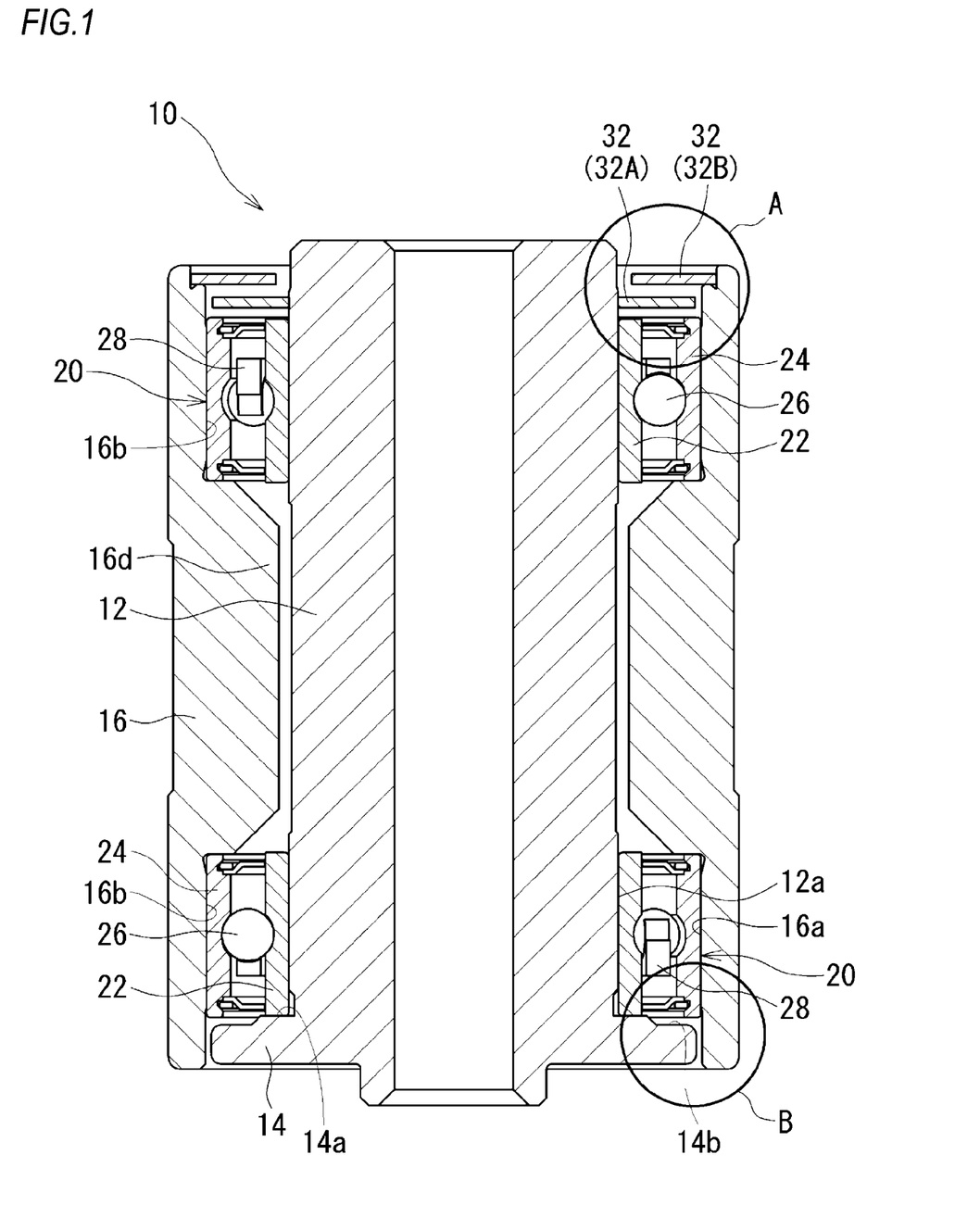
FIG. 1 is a longitudinal sectional view showing a configuration of a pivot assembly bearing device according to a first embodiment of the disclosure.

FIG. 1 schematically shows a configuration of a pivot assembly bearing device 10 according to a first embodiment of the disclosure. As shown, the pivot assembly bearing device 10 includes a shaft 12, a housing 16, and a pair of ball bearings 20 disposed between the shaft 12 and the housing 16. Each of the ball bearings 20 has an inner ring 22 fixed to an outer peripheral surface 12a of the shaft 12, an outer ring 24 fixed to an inner peripheral surface 16a of the housing 16, and an annular retainer 28 provided between the inner ring 22 and the outer ring 24 and holding a plurality of balls 26.

The shaft 12 is a hollow shaft having a flange portion 14 on one axial end side (lower end side). A lower end surface of the inner ring 22 of the ball bearing 20 disposed on the lower side abuts against an inner peripheral side of a surface 14a of the flange portion 14 facing the ball bearing 20. In this way, the inner ring 22 of the ball bearing 20 on the lower side is axially positioned with respect to the shaft 12. Also, a pair of outer ring fitting portions 16b into which the outer rings 24 of the ball bearings 20 are fitted is formed on the inner peripheral surface 16a of the housing 16. A spacer portion 16d is formed between the pair of outer ring fitting portions 16b. Further, the outer rings 24 of the pair of ball bearings 20 are fitted into the corresponding outer ring fitting portions 16b and abut against the spacer portion 16d.

In this way, the pair of ball bearings 20 is axially positioned with respect to the housing 16, and an axial distance between the pair of ball bearings 20 is set to a predetermined distance.

The diameters of the outer ring fitting portions 16b of the housing 16 are set slightly larger than the outer diameters of the outer rings 24 of the ball bearings 20. Also, the outer diameter of the flange portion 14 of the shaft 12 is set smaller than the diameters of the outer ring fitting portions 16b of the housing 16 and larger than the inner diameters of the outer rings 24 of the ball bearings 20. Further, an annular stepped portion 14b recessed from surrounding portions for avoiding the contact with the outer ring 24 of the ball bearing 20 disposed on the lower side is formed on the outer peripheral side of the surface 14a of the flange portion 14 facing the ball bearing 20. Also, as shown, the pivot assembly bearing device 10 includes two annular sealing plates 32 (32A, 32B) on the axially outer side (upper side) of the ball bearing 20 disposed on the upper side.

Figure 2A:
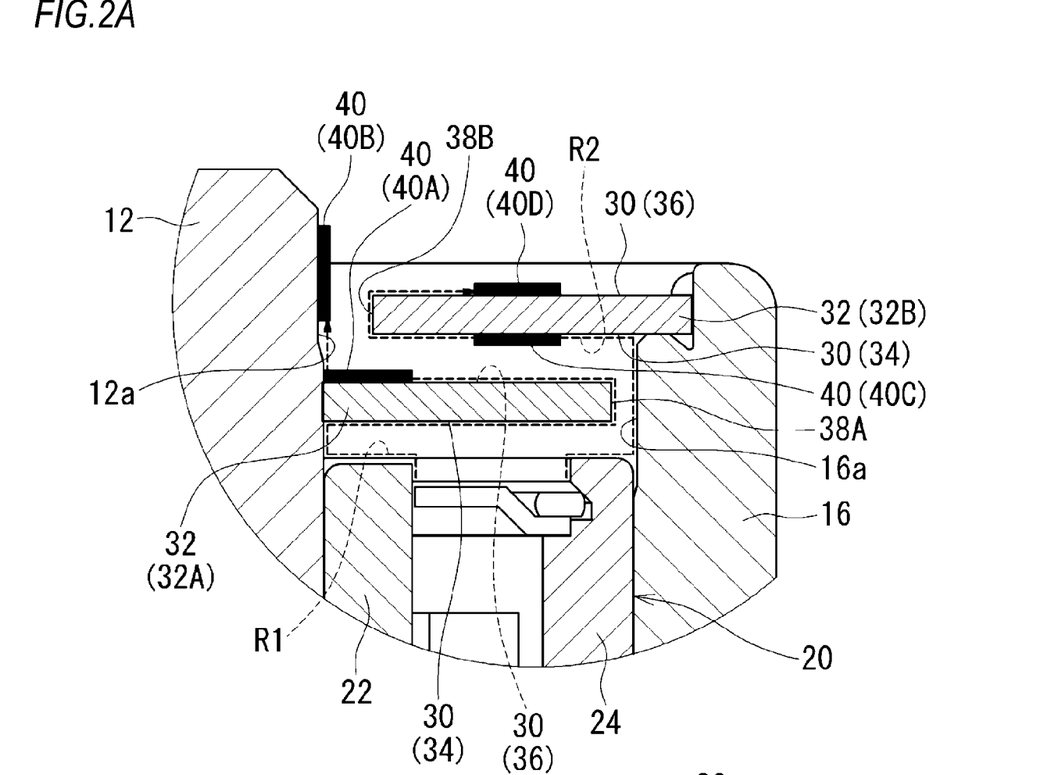
FIG. 2A is an enlarged view of a portion indicated by the reference numeral A in FIG. 1.

Here, referring to FIG. 2A, the annular sealing plate 32A installed on the lower side close to the ball bearing 20 is attached to the outer peripheral surface 12a of the shaft 12 at an axial position separated slightly upward from the ball bearing 20. Further, the annular sealing plate 32A extends radially outward from the outer peripheral surface 12a of the shaft 12 and extends to a position where a slight gap is formed between an outer peripheral surface 38A of the annular sealing plate 32A and the inner peripheral surface 16a of the housing 16. The annular sealing plate 32B installed on the upper side away from the ball bearing 20 is attached to the inner peripheral surface 16a of the housing 16 at an axial position separated slightly upward from the annular sealing plate 32A. Further, the annular sealing plate 32B extends radially inward from the inner peripheral surface 16a of the housing 16 and extends to a position where a slight gap is formed between an inner peripheral surface 38B of the annular sealing plate 32B and the outer peripheral surface 12a of the shaft 12. Also, each of the two annular sealing plates 32A, 32B has two principal surfaces, that is, a surface 34 on the ball bearing 20 side and a surface 36 on the opposite side thereof. Each of these surfaces 34, 36 corresponds to a sealing surface 30.

With the above configuration, a plurality of continuous gaps as described below is formed on the axially outer side (upper side) of the ball bearing 20. Specifically, a gap is formed between an upper end surface of the ball bearing 20 and the surface 34 (the sealing surface 30) of the annular sealing plate 32A on the ball bearing 20 side, a gap is formed between the outer peripheral surface 38A of the annular sealing plate 32A and the inner peripheral surface 16a of the housing 16, a gap is formed between the surface 36 (the sealing surface 30) of the annular sealing plate 32A on the opposite side to the surface 34 and the surface 34 of the annular sealing plate 32B on the ball bearing 20 side, and a gap is formed between the inner peripheral surface 38B of the annular sealing plate 32B and the outer peripheral surface 12a of the shaft 12. Further, these gaps form a labyrinth seal on the axially outer side of the ball bearing 20.

Also, as shown in FIG. 2A, in the pivot assembly bearing device 10, oil-repellent films 40 are annularly formed at a plurality of positions on the axially outer side of the ball bearing 20. Specifically, an oil-repellent film 40A is formed on an annular area located on the surface 36 of the annular sealing plate 32A on the shaft 12 side (left side), and an oil-repellent film 40B is formed on an annular area of the outer peripheral surface 12a of the shaft 12 located on the axially outer side of the annular sealing plate 32A. Further, oil-repellent films 40C and 40D are formed on annular areas near the centers in the radial direction of the surface 34 of the annular sealing plate 32B and the surface 36 on the opposite side thereof, respectively. These oil-repellent films 40 are formed to have a film thickness smaller than the size (the distance between the planes defining the gap) of each gap as described above. The oil-repellent films can be formed by applying oil-repellent agent with a nozzle and drying it. Since the surface on which the oil-repellent film is formed repels oil, the oil is prevented from wetting and spreading along the surface. Therefore, the component of the oil-repellent film is not particularly limited, so long as it exhibits the ability to repel oil. Examples of the oil-repellent agent can include those containing a fluorine-based compound such as a fluorine-based surfactant, a fluorine-based silane coupling agent and a fluorine-based polymer. Further, the oil-repellent agent may contain a coloring agent or a UV color former. In this case, it is preferable because the visual inspection of the oil-repellent film becomes easy. The dashed arrows R1, R2 shown in FIG. 2A will be described later.

Figure 2B:
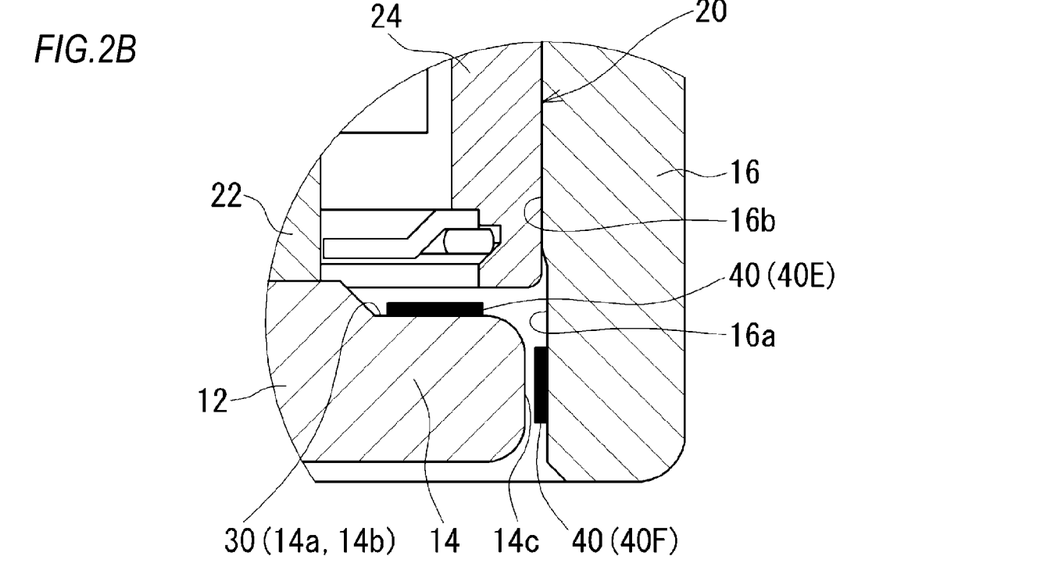
FIG. 2B is an enlarged view of a portion indicated by the reference numeral B in FIG. 1.

On the other hand, in FIG. 2B, the enlargement of the vicinity of the axially outer side of the ball bearing 20 disposed on the lower side in FIG. 1 is shown. As described above, on the surface 14a of the flange portion 14 located on the axially outer side (lower side) of the ball bearing 20 and facing the ball bearing 20, the annular stepped portion 14b which is thinner than the contact portion with the ball bearing 20 is formed in order to avoid the contact with the outer ring 24 of the ball bearing 20. Further, the stepped portion 14b, which is a part of the surface 14a facing the ball bearing 20, corresponds to the sealing surface 30. Also, as described above, the outer diameter of the flange portion 14 of the shaft 12 is set smaller than the diameter of the outer ring fitting portion 16b of the housing 16. An outer peripheral surface 14c of the flange portion 14 is located on the left side of the inner peripheral surface 16a of the housing 16 which is continuous from the outer ring fitting portion 16b.

With the above configuration, a plurality of continuous gaps as described below is formed on the axially outer side (lower side) of the ball bearing 20. Specifically, a gap is formed between a lower end surface of the ball bearing 20 and the stepped portion 14b (the sealing surface 30) of the flange portion 14, and a gap is formed between the outer peripheral surface 14c of the flange portion 14 and the inner peripheral surface 16a of the housing 16. Further, these continuous gaps form a labyrinth seal on the axially outer side of the ball bearing 20. Further, as shown in FIG. 2B, the pivot assembly bearing device 10 also has the annular oil-repellent films 40 at a plurality of positions on the axially outer side of the ball bearing 20. Specifically, an oil-repellent film 40E is formed in an annular area corresponding to the stepped portion 14b of the flange portion 14, and an oil-repellent film 40F is formed within an annular area which is a part of the inner peripheral surface 16a of the housing 16 and located on the axially outer side of the ball bearing 20. Similar to the oil-repellent films 40 shown in FIG. 2A, these oil-repellent films 40 are formed to have a film thickness smaller than the width (the distance between the planes defining the gap) of each gap as described above. Also, the component of the oil-repellent film is not particularly limited, so long as it exhibits the ability to repel oil.

Figure 3A:
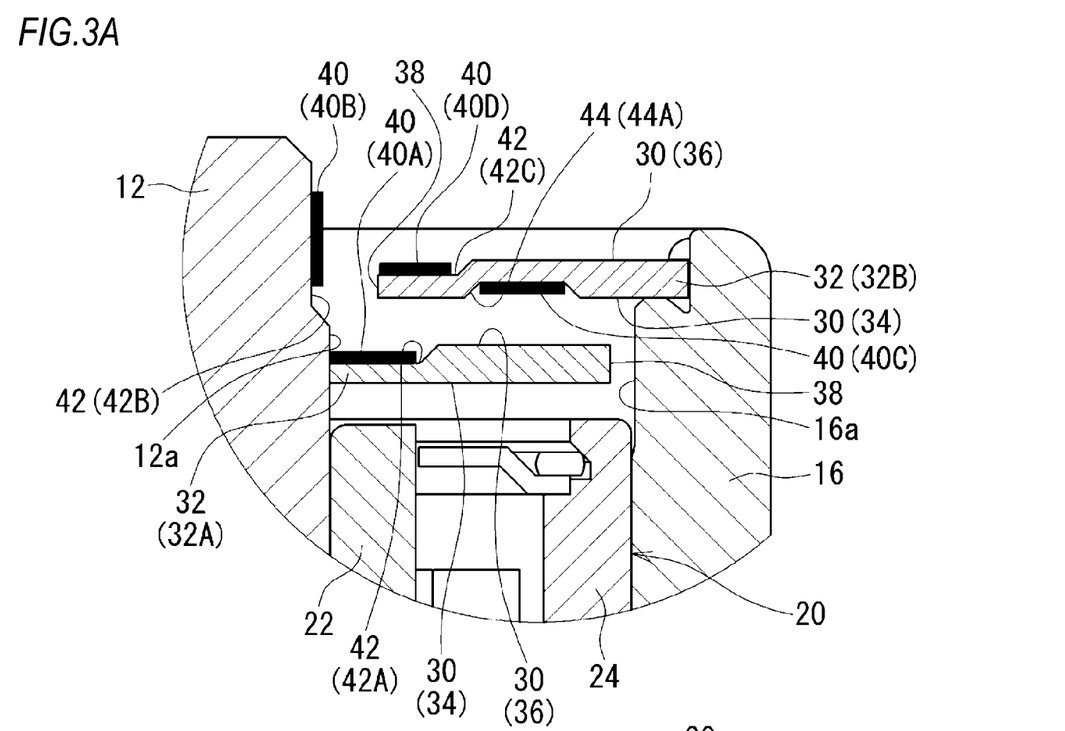
FIG. 3A is an enlarged view of a portion corresponding to the portion indicated by the reference numeral A in FIG. 1.
Figure 3B:
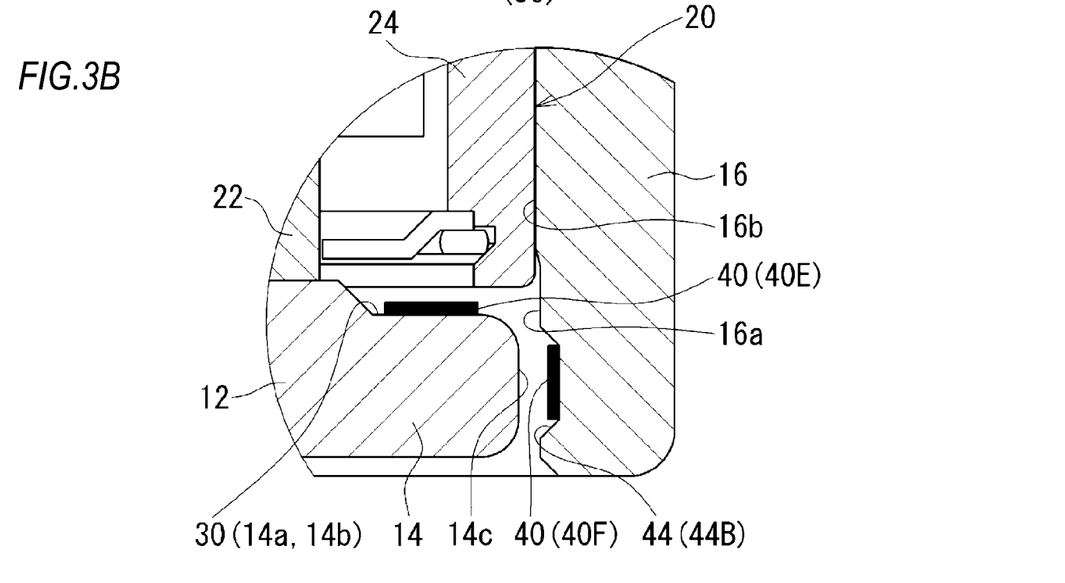
FIG. 3B is an enlarged view of a portion corresponding to the portion indicated by the reference numeral B in FIG. 1.

Next, a modification of the pivot assembly bearing device 10 according to the first embodiment of the disclosure will be described with reference to FIGS. 3A and 3B. FIGS. 3A and 3B show the parts corresponding to FIGS. 2A and 2B, respectively. Here, only the modified parts in the modification will be described.

As shown in FIGS. 3A and 3B, in the modification of the pivot assembly bearing device 10, annular stepped portions 42 or annular grooves 44 recessed from surrounding portions are provided on the surfaces forming the oil-repellent films, and the oil-repellent films 40 are formed on the annular stepped portions 42 or the annular grooves 44. Specifically, as shown in FIG. 3A, the oil-repellent film 40A is formed on the annular stepped portion 42A of the surface 36 (the sealing surface 30) on the opposite side to the surface 34 (the sealing surface 30) of the annular sealing plate 32A facing the ball bearing 20, and the oil-repellent film 40B is formed on the annular stepped portion 42B of the outer peripheral surface 12a of the shaft 12. Further, the oil-repellent film 40C is formed on the annular groove 44A of the surface 34 of the annular sealing plate 32B, and the oil-repellent film 40D is formed on the annular stepped portion 42C of the surface 36 of the annular sealing plate 32B.

Here, the oil-repellent film 40D shown in FIG. 3A is formed at a position different from that of the oil-repellent film 40D shown in FIG. 2A. That is, as is apparent by comparing two cases, in FIG. 3A, the groove 44A and the stepped portion 42C provided at positions corresponding to the oil-repellent films 40C, 40D are provided at positions not overlapping with each other in the axial direction (upper and lower direction) of the annular sealing plate 32B. Further, the oil-repellent film 40D is formed at a position on the inner peripheral side (left side) of the annular sealing plate 32B than the oil-repellent film 40D in FIG. 2A. In this manner, the oil-repellent films 40C, 40D formed on the surfaces 34, 36 of the annular sealing plate 32B are formed at different positions along the radial direction (right and left direction) of the annular sealing plate 32B.

Also, as shown in FIG. 3B, in the vicinity of the flange portion 14 of the shaft 12, the oil-repellent film 40F is formed on the portion of the inner peripheral surface 16a of the housing 16 where the annular groove 44B is provided. Each of the stepped portions 42A to 42C and the grooves 44A, 44B described above is formed to have a depth larger than the film thickness of the oil-repellent film 40 formed thereon. Since the oil-repellent film 40E is formed on the stepped portion 14b of the flange portion 14 in the embodiment shown in FIG. 2B, there is no particular change in the modification shown in FIG. 3B.

Subsequently, pivot assembly bearing devices 10', 10", 10'" according to second to fourth embodiments of the disclosure will be described with reference to FIGS. 4 to 8. In FIGS. 4 to 8, the same reference numerals are given to the parts same to or corresponding to those of the pivot assembly bearing device 10 according to the first embodiment of the disclosure. In addition, for each of the pivot assembly bearing device 10', the pivot assembly bearing device 10" and the pivot assembly bearing device 10'" according to the second to fourth embodiments of the disclosure, only the parts different from those of the pivot assembly bearing device 10 according to the first embodiment of the disclosure will be described and the description of parts similar to those of the pivot assembly bearing device 10 according to the first embodiment of the disclosure will be omitted.

Figure 4:
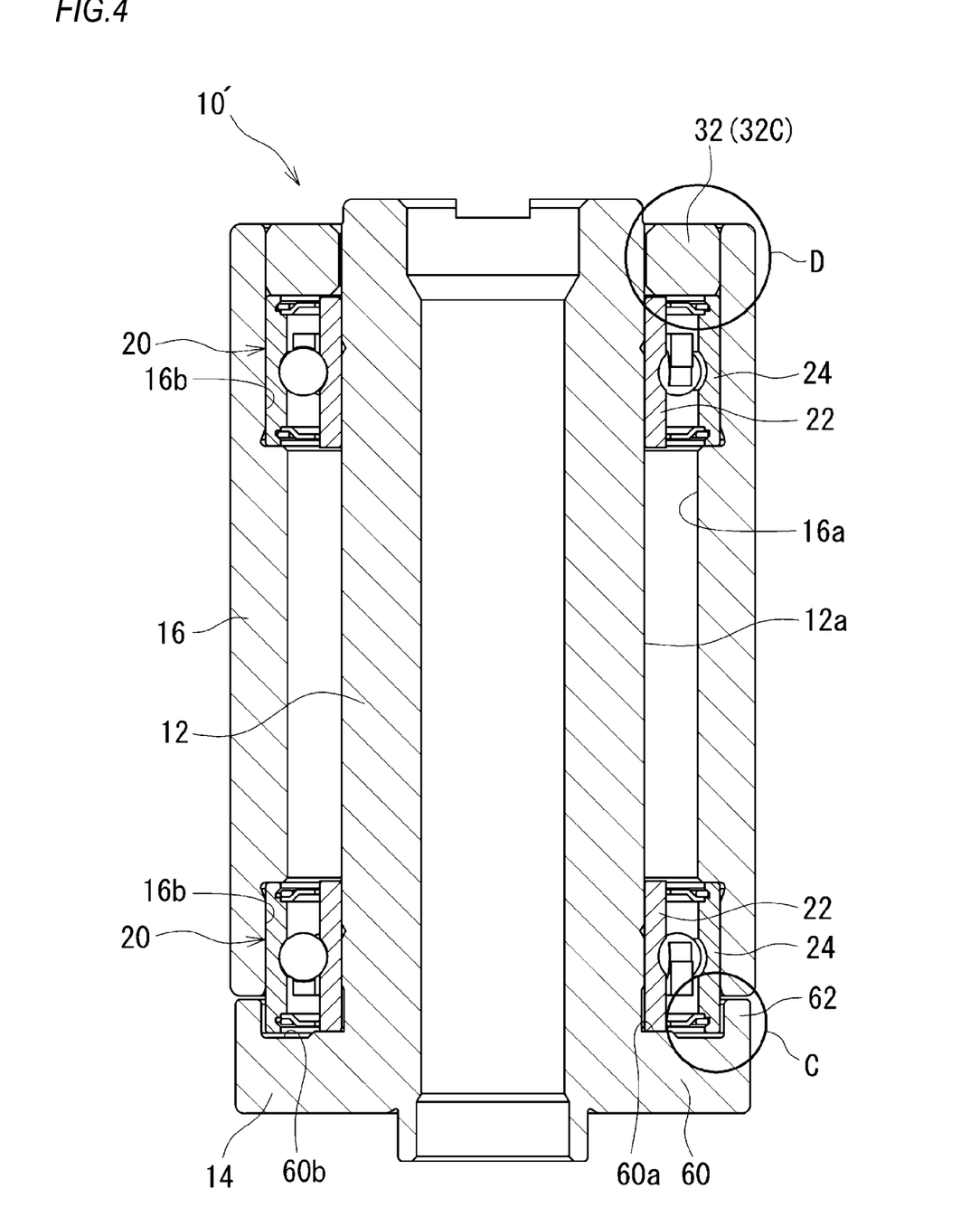
FIG. 4 is a longitudinal sectional view showing a configuration of a pivot assembly bearing device according to a second embodiment of the disclosure.

As shown in FIG. 4, the shaft 12 of the pivot assembly bearing device 10' according to the second embodiment of the disclosure is a hollow shaft having the flange portion 14 on one axial end side (lower end side). The flange portion 14 has a disk portion 60 extending in the radial direction and a cylinder portion 62 extending in the axial direction (upward) so as to cover the outer side in the radial direction of the ball bearing 20 from the outer edge of the disk portion 60. A concave portion recessed in the axial direction is formed by the disk portion 60 and the cylinder portion 62. One end portion of the ball bearing 20 is accommodated inside the concave portion. Further, a lower end surface of the inner ring 22 of the ball bearing 20 disposed on the lower side abuts against an inner peripheral side of a surface 60a of the disk portion 60 facing the ball bearing 20. In this way, the inner ring 22 of the ball bearing 20 on the lower side is axially positioned with respect to the shaft 12. Further, an annular stepped portion 60b for avoiding the contact with the outer ring 24 of the ball bearing 20 disposed on the lower side is formed on the outer peripheral side of the surface 60a of the disk portion 60 facing the ball bearing 20.

Also, as shown, the pivot assembly bearing device 10' includes an annular sealing plate 32C (32) on the axially outer side (upper side) of the ball bearing 20 disposed on the upper side. The annular sealing plate 32C is disposed so as to close a gap between the shaft 12 and the housing 16, and an outer peripheral surface of the annular sealing plate 32C is fixed to the inner peripheral surface 16a of the housing 16 by means of bonding or the like.

Figure 5A:
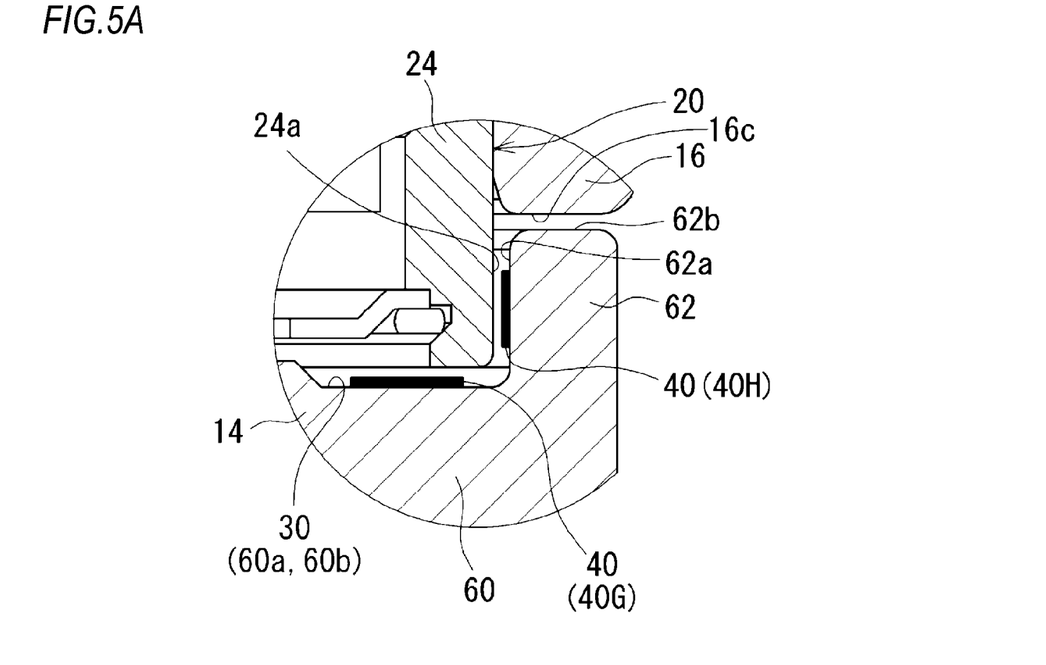
FIG. 5A is an enlarged view of a portion indicated by the reference numeral C in FIG. 4.

Here, in FIG. 5A, the enlarged view of a vicinity C of the axially outer side of the ball bearing 20 disposed on the lower side in FIG. 4 is shown. As described above, the annular stepped portion 60b is formed on the surface 60a of the disk portion 60 facing the ball bearing 20. Further, the stepped portion 60b is the sealing surface 30. Also, the inner diameter of the cylinder portion 62 is set slightly larger than the outer diameter of the outer ring 24 of the ball bearing 20. An inner peripheral surface 62a of the cylinder portion 62 is positioned on the right side of an outer peripheral surface 24a of the outer ring 24 of the ball bearing 20. In addition, an axial end surface 62b of the cylinder portion 62 is positioned on the lower side of an axial end surface 16C of the housing 16.

With the above configuration, a plurality of continuous gaps as described below is formed in the vicinity of the axially outer side (lower side) of the ball bearing 20. Specifically, a gap is formed between a lower end surface of the ball bearing 20 and the stepped portion 60b of the disk portion 60, a gap is formed between the outer peripheral surface 24a of the outer ring 24 of the ball bearing 20 and the inner peripheral surface 62a of the cylinder portion 62, and a gap is formed between the axial end surface 16c of the housing 16 and the axial end surface 62b of the cylinder portion 62. Further, these gaps form a labyrinth seal in the vicinity of the axially outer side of the ball bearing 20. Further, as shown in FIG. 5A, in the pivot assembly bearing device 10', the oil-repellent films 40 are annularly formed at a plurality of positions in the vicinity of the axially outer side of the ball bearing 20. Specifically, an annular oil-repellent film 40G facing an end surface of the ball bearing 20 is formed on the stepped portion 60b (the sealing surface 30) of the disk portion 60, and an annular oil-repellent film 40H facing an outer peripheral surface of the ball bearing 20 is formed on the inner peripheral surface 62a of the cylinder portion 62.

Figure 5B:
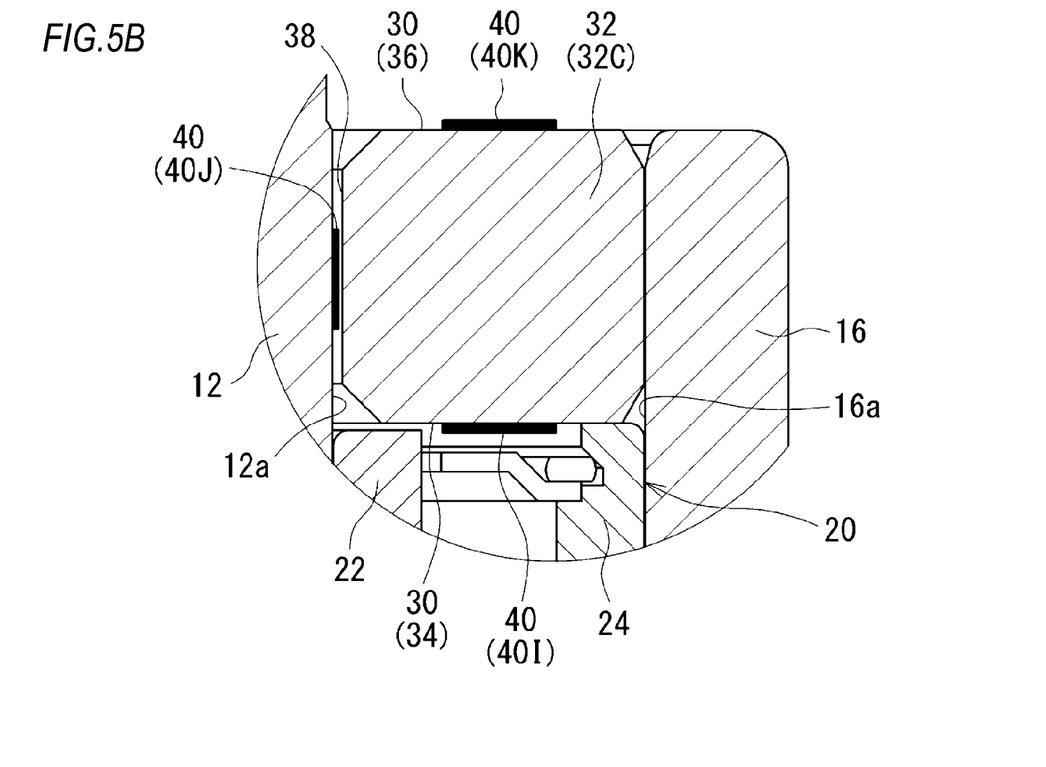
FIG. 5B is an enlarged view of a portion indicated by the reference numeral D in FIG. 4.

On the other hand, in FIG. 5B, the enlargement of a vicinity D of the axially outer side of the ball bearing 20 disposed on the upper side in FIG. 4 is shown. As described above, the annular sealing plate 32C is fixed to the inner peripheral surface 16a of the housing 16 and extends radially inward (leftward) from the inner peripheral surface 16a of the housing 16. Also, the annular sealing plate 32C has two principal surfaces extending in the radial direction, that is, the surface 34 on the ball bearing 20 side and the surface 36 on the opposite side thereof. Each of these surfaces 34, 36 is the sealing surface 30. An upper end surface of the outer ring 24 of the ball bearing 20 abuts against the outer peripheral side (right side) of the surface 34 on the ball bearing 20 side. On the other hand, a portion of the upper end surface of the ball bearing 20 other than the outer ring 24 is slightly separated from the surface 34. Also, the inner diameter of the annular sealing plate 32C is set slightly larger than the outer diameter of the shaft 12, and an inner peripheral surface 38 of the annular sealing plate 32C is positioned on the right side of the outer peripheral surface 12a of the shaft 12.

With the above configuration, a plurality of continuous gaps as described below is formed on the axially outer side (upper side) of the ball bearing 20. Specifically, a gap is formed between the upper end surface of the ball bearing 20 and the surface 34 (the sealing surface 30) of the annular sealing plate 32C, and a gap is formed between the inner peripheral surface 38 of the annular sealing plate 32C and the outer peripheral surface 12a of the shaft 12. Further, these gaps form a labyrinth seal on the axially outer side of the ball bearing 20. Also, in the pivot assembly bearing device 10', the oil-repellent films 40 are annularly formed at a plurality of positions on the axially outer side of the ball bearing 20 shown in FIG. 5B. Specifically, oil-repellent films 40I and 40K are annularly formed near the centers in the left and right direction of the surface 34 and the surface 36 (the sealing surface 30) on the opposite side thereof, respectively. Further, an oil-repellent film 40J is annularly formed on the portion in the axially outer side of the outer peripheral surface 12a of the shaft 12 than the ball bearing 20, that is, the portion of the outer peripheral surface 12a facing the inner peripheral surface 38 of the annular sealing plate 32C.

Figure 6:
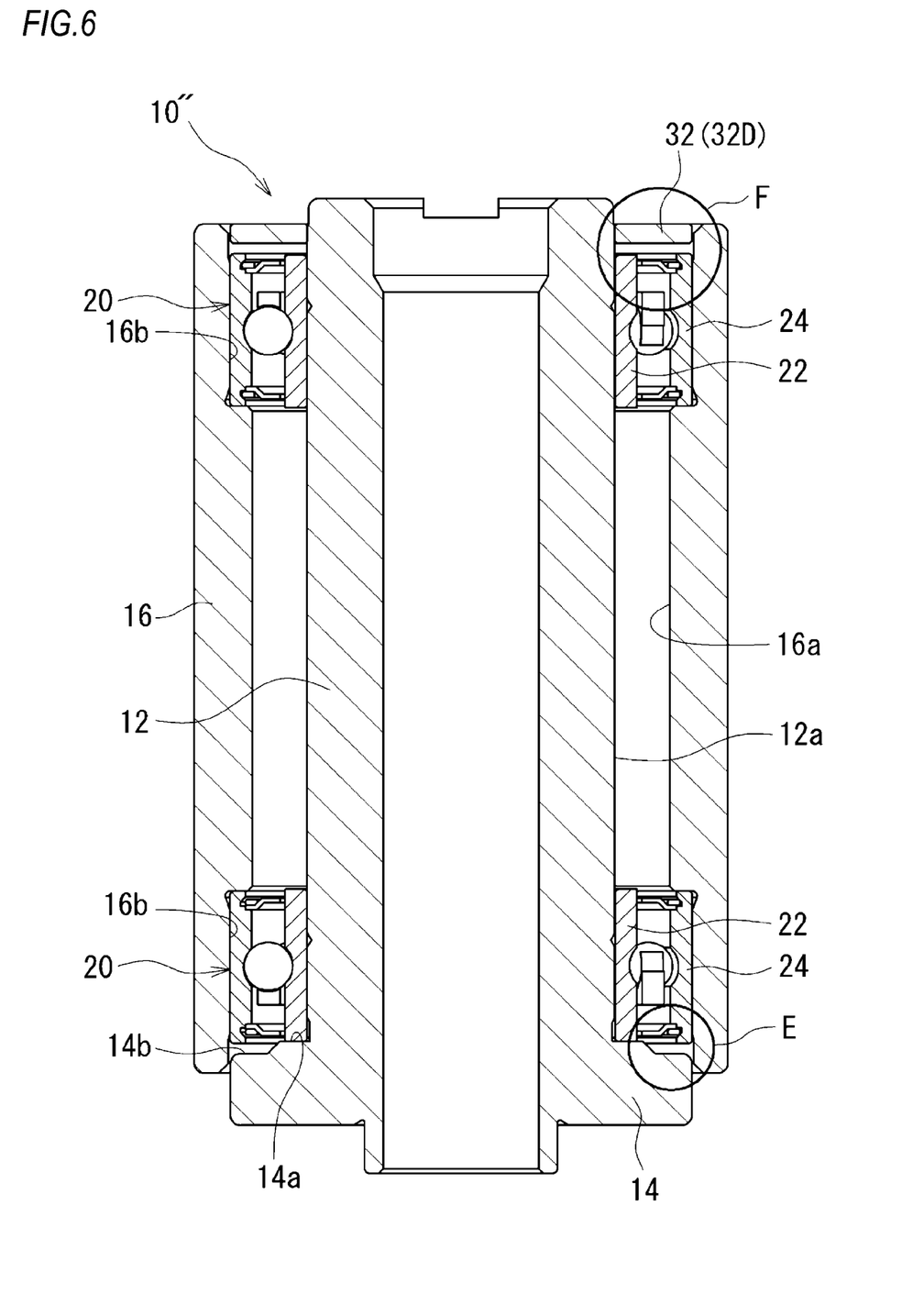
FIG. 6 is a longitudinal sectional view showing a configuration of a pivot assembly bearing device according to a third embodiment of the disclosure.

Subsequently, the pivot assembly bearing device 10" according to the third embodiment of the disclosure will be described with reference to FIGS. 6 and 7. As shown in FIG. 6, the shaft 12 of the pivot assembly bearing device 10" is a hollow shaft having the flange portion 14 on one axial end side (lower end side). A lower end surface of the inner ring 22 of the ball bearing 20 disposed on the lower side abuts against the inner peripheral side of the surface 14a of the flange portion 14 facing the ball bearing 20. Further, the annular stepped portion 14b for avoiding the contact with the outer ring 24 of the ball bearing 20 disposed on the lower side is formed on the outer peripheral side of the surface 14a of the flange portion 14 facing the ball bearing 20.

Also, the pivot assembly bearing device 10" includes one annular sealing plate 32D (32) on the axially outer side (upper side) of the ball bearing 20 disposed on the upper side. The annular sealing plate 32D is disposed so as to close a gap between the shaft 12 and the housing 16, and an inner peripheral surface of the annular sealing plate 32D is fixed to the outer peripheral surface 12a of the shaft 12 by means of adhesion or the like.

Figure 7A:
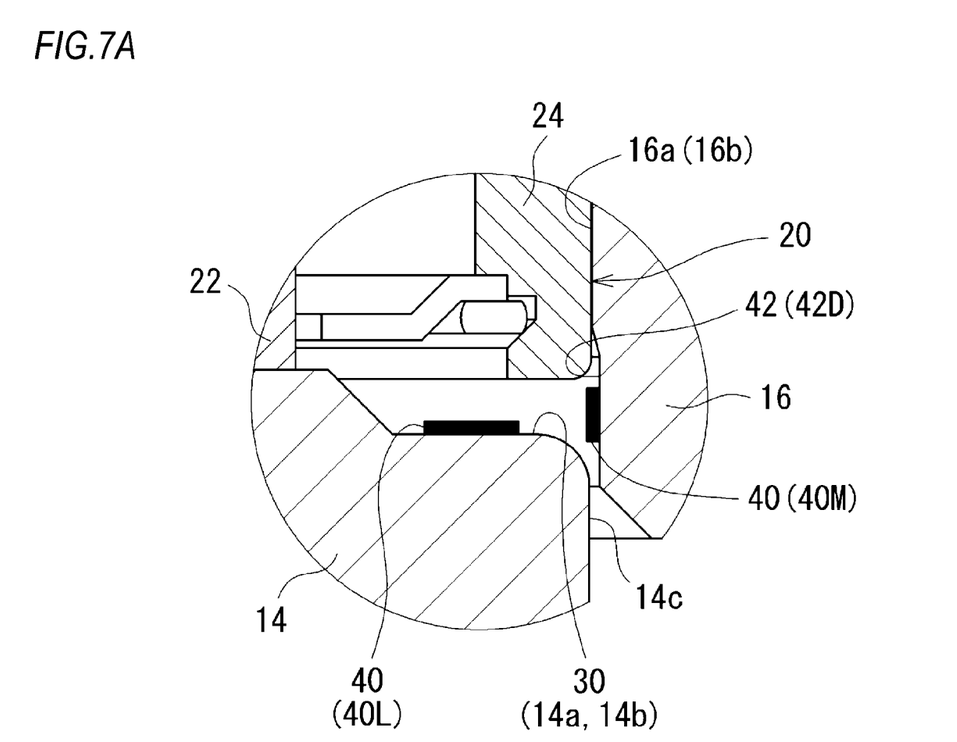
FIG. 7A is an enlarged view of a portion indicated by the reference numeral E in FIG. 6.

Referring to FIG. 7A, as described above, the annular stepped portion 14b for avoiding the contact with the outer ring 24 of the ball bearing 20 is formed on the surface 14a of the flange portion 14 facing the ball bearing 20 in FIG. 6. Further, the stepped portion 14b is the sealing surface 30. Also, the outer diameter of the flange portion 14 of the shaft 12 is set slightly smaller than the diameter of the outer ring fitting portion 16b of the housing 16. An annular stepped portion 42D is provided on the inner peripheral surface 16a of the housing 16 at a position below the outer ring fitting portion 16b.

With the above configuration, a plurality of continuous gaps as described below is formed on the axially outer side (lower side) of the ball bearing 20. Specifically, a gap is formed between the lower end surface of the ball bearing 20 and the stepped portion 14b of the flange portion 14, and a gap is formed between the outer peripheral surface 14c of the flange portion 14 and the stepped portion 42D provided on the inner peripheral surface 16a of the housing 16. Further, these gaps form a labyrinth seal on the axially outer side of the ball bearing 20. Further, in the pivot assembly bearing device 10″, the oil-repellent films 40 are annularly formed at a plurality of positions on the axially outer side of the ball bearing 20. Specifically, an oil-repellent film 40L is annularly formed on the stepped portion 14b of the flange portion 14, and an oil-repellent film 40M is annularly formed on the stepped portion 42D provided on the inner peripheral surface 16a of the housing 16.

Figure 7B:
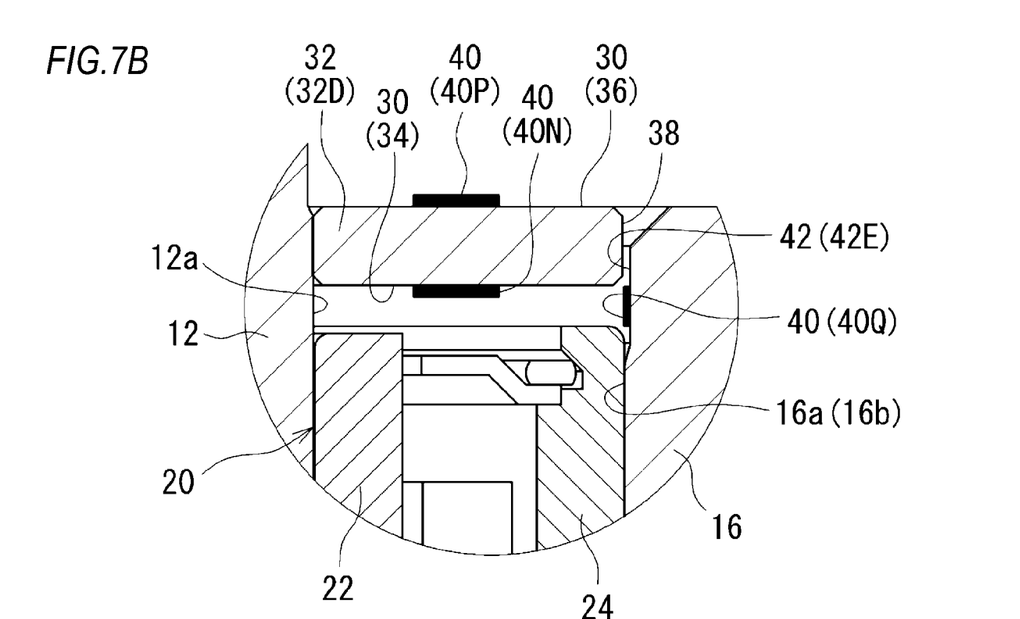
FIG. 7B is an enlarged view of a portion indicated by the reference numeral F in FIG. 6.

On the other hand, by referring to FIG. 7B, the annular sealing plate 32D is fixed to the outer peripheral surface 12a of the shaft 12 as described above at the axial position slightly separated upward from the ball bearing 20. Further, the annular sealing plate 32D extends radially (rightward) from the outer peripheral surface 12a of the shaft 12 and extends slightly near the outer ring fitting portion 16b of the housing 16. Also, the annular sealing plate 32D has two principal surfaces extending in the radial direction, that is, the surface 34 on the ball bearing 20 side and the surface 36 on the opposite side thereof. Each of these surfaces 34, 36 is the sealing surface 30. An annular stepped portion 42E is provided on the inner peripheral surface 16a of the housing 16 at a position above the outer ring fitting portion 16b.

With the above configuration, a plurality of continuous gaps as described below is formed on the axially outer side (upper side) of the ball bearing 20. Specifically, a gap is formed between the upper end surface of the ball bearing 20 and the surface 34 (the sealing surface 30) of the annular sealing plate 32D, and a gap is formed between the inner peripheral surface 38 of the annular sealing plate 32C and the stepped portion 42E of the housing 16. Further, these gaps form a labyrinth seal on the axially outer side of the ball bearing 20. Further, in the pivot assembly bearing device 10″, the oil-repellent films 40 are annularly formed at a plurality of positions on the axially outer side of the ball bearing 20 shown in FIG. 7B. Specifically, oil-repellent films 40N and 40P are annularly formed near the centers in the left and right direction of the surface 34 (the sealing surface 30) of the annular sealing plate 32D and the surface 36 (the sealing surface 30) on the opposite side thereof, respectively. Further, an oil-repellent film 40Q is annularly formed on the stepped portion 42E provided on the inner peripheral surface 16a of the housing 16.

Subsequently, the pivot assembly bearing device 10‴ according to the fourth embodiment of the disclosure will be described with reference to FIG. 8. As shown, the pivot assembly bearing device 10″ includes the pair of ball bearing 20 attached to the shaft 12 at an interval in the axial direction (upper and lower direction). The shaft 12 is a hollow shaft having the flange portion 14 on one axial end side (lower end side). The lower end surface of the inner ring 22 of the ball bearing 20 disposed on the lower side abuts against the inner peripheral side of the surface 14a of the flange portion 14 facing the ball bearing 20. In this way, the ball bearing 20 on the lower side is vertically (axially) positioned with respect to the shaft 12.

Further, an annular spacer 64 is disposed between the outer ring 24 of the ball bearing 20 on the lower side and the outer ring 24 of the ball bearing 20 on the upper side. In this way, the ball bearing 20 on the upper side is axially positioned with respect to the shaft 12 via the spacer 64 and the ball bearing 20 on the lower side. Also, the pair of ball bearings 20 is attached to the shaft 12 in a state where preload is applied. The pivot assembly bearing device 10‴ shown in FIG. 8 is assembled, in the state shown, to a swing arm 52 of a hard disk drive 50 shown in FIG. 9, for example. In this way, the pair of ball bearings is sandwiched between the swing arm 52 and the shaft 12, and the swing arm 52 functions as housing.

Figure 8:
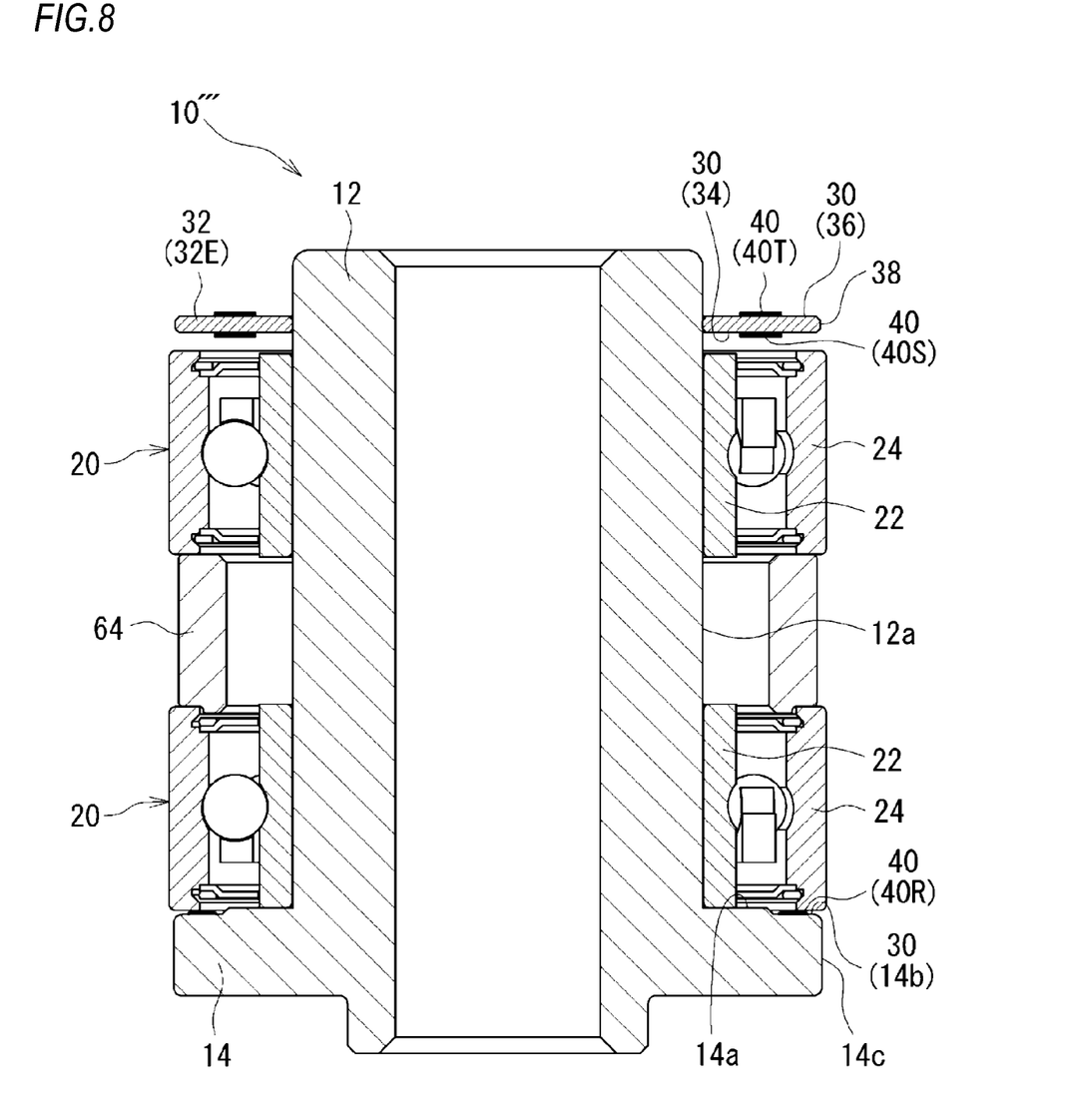
FIG. 8 is a longitudinal sectional view showing a configuration of a pivot assembly bearing device according to a fourth embodiment of the disclosure.

Further, by referring to FIG. 8, the annular stepped portion 14b for avoiding the contact with the outer ring 24 of the ball bearing 20 disposed on the lower side is formed on the outer peripheral side of the surface 14a of the flange portion 14 facing the ball bearing 20. The stepped portion 14b is the sealing surface 30. Also, the outer diameter of the flange portion 14 is set slightly smaller than the outer diameter of the outer ring 24 of the ball bearing 20. Therefore, when the pivot assembly bearing device 10‴ is assembled to the swing arm 52, a gap is formed between an inner peripheral portion of the assembled portion of the swing arm 52 and the outer peripheral surface 14c of the flange portion 14. That is, on the axially outer side of the ball bearing 20 disposed on the lower side, a gap between the lower end surface of the ball bearing 20 and the stepped portion 14b (the sealing surface 30) of the flange portion 14 and a gap between the outer peripheral surface 14c of the flange portion 14 and the inner peripheral surface of the assembled portion of the swing arm 52 form a labyrinth seal. Further, the oil-repellent film 40 (40R) is annularly formed on the stepped portion 14b of the flange portion 14.

On the other hand, an annular sealing plate 32E is fixed to the upper side of the outer peripheral surface 12a of the shaft 12 at an interval from the ball bearing 20 disposed on the upper side. The annular sealing plate 32E extends radially from the outer peripheral surface 12a of the shaft 12 and has two principal surfaces, that is, the surface 34 on the ball bearing 20 side and the surface 36 on the opposite side thereof. Each of these surfaces 34, 36 is the sealing surface 30. Also, the outer diameter of the annular sealing plate 32E is slightly smaller than the outer diameter of the outer ring 24 of the ball bearing 20. Therefore, when the pivot assembly bearing device 10‴ is assembled to the swing arm 52, a gap is formed between the inner peripheral surface of the assembled portion of the swing arm 52 and an outer peripheral surface 38 of the annular sealing plate 32E. That is, on the axially outer side of the ball bearing 20 disposed on the upper side, a gap between the upper end surface of the ball bearing 20 and the surface 34 of the annular sealing plate 32E and a gap between the outer peripheral surface 38 of the annular sealing plate 32E and the inner peripheral surface of the assembled portion of the swing arm 52 form a labyrinth seal. Further, oil-repellent films 40S and 40T are annularly formed near the centers in the left and right direction of the surface 34 (the sealing surface 30) of the annular sealing plate 32E and the surface 36 (the sealing surface 30) on the opposite side thereof, respectively.

Figure 9:
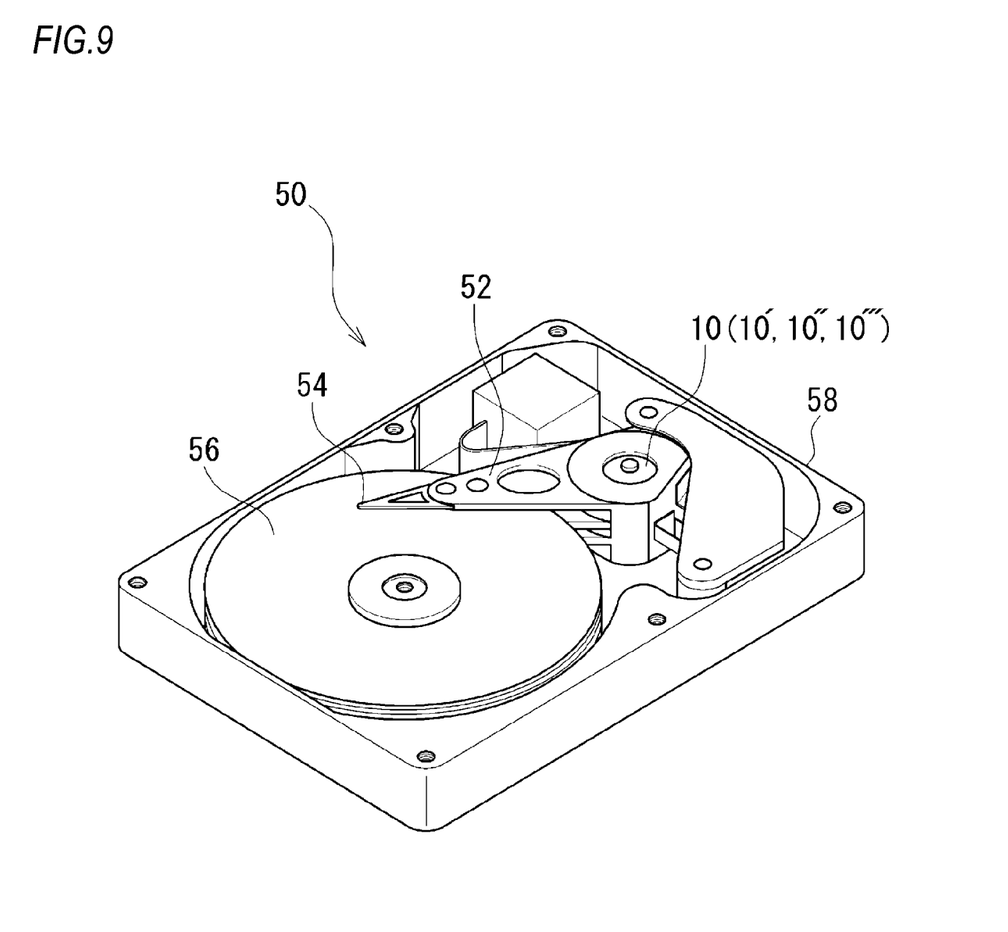
FIG. 9 is a perspective view showing a configuration of a typical hard disk drive.

FIG. 9 illustrates the hard disk drive 50 to which the pivot assembly bearing devices 10, 10′, 10″, 10‴ according to the above-described embodiments of the disclosure are assembled. The hard disk drive 50 includes the swing arm 52 swingably supported by the pivot assembly bearing devices 10, 10′, 10″, 10‴. In the hard disk drive 50, a magnetic head 54 disposed at the tip of the swing arm 52 moves on a magnetic disk 56, so that information can be recorded on the magnetic disk 56 and the recorded information can be read from the magnetic disk 56. The respective components of the hard disk drive 50 are accommodated in a casing 58. The housing 16 of the pivot assembly bearing devices 10, 10′, 10″ or the outer ring 24 of the ball bearing 20 of the pivot assembly bearing device 10‴ is fitted and mounted to a mounting hole (not shown) passing through a swing arm block of the swing arm 52 in the upper and lower direction. By this way, the swing arm 52 is attached to the hard disk drive 50 so as to be rotatable relative to the shaft 12.

According to the embodiments of the disclosure having the above configuration, the following operational effects can be obtained. Specifically, grease as lubricant is enclosed in the ball bearings 20 of the pivot assembly bearing devices 10, 10', 10″, 10‴ according to the first to fourth embodiments of the disclosure. When base oil constituting the grease oozes out through the labyrinth seal, the oozing path of the base oil is as indicated by the dashed line arrows R1, R2 in FIG. 2A, for example. The base oil is considered to be transmitted along the sealing surfaces 30 defining the gaps forming the labyrinth seal or the outer peripheral surface 12a of the shaft 12 or the like at a position axially outside the ball bearings 20. Therefore, in the pivot assembly bearing devices 10, 10', 10″, 10‴ according to the embodiments of the disclosure, as described above, the oil-repellent films 40 are annularly formed on at least one of the sealing surfaces 30 provided on the axially outer side of the ball bearings 20 and the part of the outer peripheral surface 12a of the shaft 12 located axially outward from the ball bearings 2. In this way, the oil-repellent films 40 for repelling the oil are present on the path along which the base oil of the grease is transmitted. Therefore, it is possible to effectively suppress the oozing of the base oil of the grease while achieving the sealing effect by the labyrinth seal. Specifically, for example, when the pivot assembly bearing devices 10, 10', 10″, 10‴ according to the embodiments of the disclosure is used for the swing arm 52 of the hard disk drive 50 as shown in FIG. 9, it is possible to suppress the oozing of the grease into the external space, that is, the space inside the casing 58 of the hard disk drive 50.

Moreover, in the pivot assembly bearing devices 10, 10', 10″, 10‴ according to the embodiments of the disclosure, the oil-repellent film 40 can be easily formed, unlike the conventional pivot assembly bearing device. That is, when the oil-repellent film 40 is provided on the annular sealing surface 30, it is possible to prevent the oil-repellent agent from dripping by applying oil-repellent agent on the sealing surface 30 in a horizontal position. On the other hand, when the oil-repellent film 40 is provided on the outer peripheral surface 12a of the shaft 12 as shown in FIG. 2A for example, the sealing surface 30 (36) radially extending from the axial position of the outer peripheral surface 12a of the shaft 12 may be provided between the ball bearing 20 and the position at which the oil-repellent film 40. In this configuration, since the oil-repellent agent applied on the outer peripheral surface 12a of the shaft 12 is stopped at the sealing surface 30, the inside of the ball bearings 20 is not contaminated even when the oil-repellent agent falls down. Therefore, the oil-repellent agent can be applied without any problem and the oil-repellent film 40 can be easily formed, so that the entire device can be easily manufactured.

Further, when the oil-repellent film 40 is formed on the surface 34 on the ball bearing 20 side of the annular sealing plate 32, the oil-repellent film 40 is formed before the annular sealing plate 32 is attached to the shaft 12 or the housing 16. In this way, when attaching the annular sealing plate 32, the oil-repellent film 40 faces inward in the axial direction (toward the ball bearing 20). Therefore, the oil-repellent film 40 does not come into contact with the jig or the like and there is no problem that the oil-repellent film 40 is peeled off. Also, when the oil-repellent film 40 is formed on the surface 36 of the annular sealing plate 32 on the opposite side to the ball bearing 20, the oil-repellent agent can be easily applied even after the annular sealing plate 32 is attached to the shaft 12 or the housing 16 because the surface 36 faces axially outward. Consequently, the oil-repellent film 40 can be easily formed regardless of which of the two principal surfaces 34, 36 of the annular sealing plate 32 the oil-repellent film 40 is formed on.

The pivot assembly bearing device according to the embodiment of the disclosure is not limited to each of the above-described embodiments, and may take various forms. For example, the annular sealing plate 32 defining the sealing surface 30 is not limited to the flat surface as the surface 34 on the ball bearing 20 side and the surface 36 on the opposite side shown in FIGS. 2, 5, 7 and 8. The annular sealing plate 32 may include the stepped portion 42 and the groove 44 as shown in FIG. 3. In other words, the surfaces 34 and 36 may include recesses and protrusions. Therefore, the annular sealing plate 32 may be provided with a plurality of stepped portions 42 and grooves 44 at different positions in the radial direction of the annular sealing plate 32. In this case, the cross section in the plane defined by the radial direction and the axial direction may become zigzag. Further, for example, similarly to the annular sealing plate 32B shown in FIG. 3A, the stepped portion 42 which becomes lower toward the surface at the other side may be provided on the inner peripheral side of the surface at the one side of the annular sealing plate 32 and the stepped portion 42 which becomes lower toward the surface at the one side may be provided on the outer peripheral side of the surface at the other side of the annular sealing plate 32 so that the cross section has a stepped shape.

Similarly, also for the flange portion 14 of the shaft 12, a plurality of stepped portions 42 and grooves 44 may be formed on the sealing surface 30. Further, for the sealing surface 30 on which the stepped portions 42 and the grooves 44 are provided as described above, the oil-repellent films 40 may be formed on the plurality of stepped portions 42 and grooves 44. Also in this case, oil-repellent agent can be applied on the sealing surface 30 in a horizontal state, so that the oil-repellent films 40 can be easily formed.

Also, in the pivot assembly bearing devices according to the embodiments of the disclosure, the formation positions of the oil-repellent films 40 on the sealing surface 30 or the outer peripheral surface 12a of the shaft 12 may be arbitrarily set as appropriate. For example, the oil-repellent film 40A shown in FIG. 2A is formed at a position of the sealing surface 30 of the annular sealing plate 32A on the shaft 12 side (on the left side). This formation position is a position farthest from the outer peripheral surface 38A which is a free end of the annular sealing plate 32A. Therefore, even when oil-repellent agent slightly spreads before it dries, the oil-repellent agent does not reach the outer peripheral surface 38A, and there is no possibility of contaminating the ball bearing 20.

Further, in the pivot assembly bearing devices according to the embodiments of the disclosure, in the case where the inner peripheral surface 16a of the housing 16 is included in the oozing path of the base oil of the grease enclosed in the ball bearing 20, the oil-repellent films 40 may be provided on the inner peripheral surface 16a of the housing 16 as in the oil-repellent films 40F, 40M, 40Q shown in FIGS. 2B and 7, for example. In this case, as shown in FIGS. 3B and 7, the groove 44B and the stepped portions 42D, 42E or the like may be provided on the portion of the inner peripheral surface 16a of the housing 16 where the oil-repellent film 40 is formed. In this way, there is no possibility that the oil-repellent film 40 rubs against the outer ring 24 of the ball bearing 20 and peels off during assembly. Thus, the oil-repellent film 40 can be easily formed before assembling.

Also, in the pivot assembly bearing devices according to the embodiments of the disclosure, the number of the annular sealing plates 32 attached to the axially outer side of the ball bearing 20 can be arbitrarily selected. For example, the number of the annular sealing plates 32 may be one as in the examples of FIGS. 5B, 7B and 8, or may be two as in the example of FIG. 2A, or may be three or more. In addition, the thickness of the annular sealing plate 32 is also arbitrary. For example, as in the annular sealing plate 32C shown in FIG. 5B, the thickness of the annular sealing plate 32 may be equal to or greater than the length in the radial direction (left and right direction) of two principal surfaces 34, 36. Further, for example, as shown in FIGS. 4 and 5A, the shape of the flange portion 14 of the shaft 12 is also arbitrary, so long as the sealing surface 30 is formed thereon. Also, the pivot assembly bearing devices according to the embodiments of the disclosure can be also applied to a pivot assembly bearing device in which a housing is omitted, as in the pivot assembly bearing device 10''' shown in FIG. 8.

The disclosure provides illustrative, non-limiting examples as follows:

(Aspects of Disclosure)

The following aspects of the disclosure exemplify the configuration of the disclosure and are separately described in order to facilitate understanding of various configurations of the disclosure. Each aspect does not limit the technical scope of the disclosure. With reference to the best modes for carrying out the disclosure, the constituent elements in each aspect may be partially replaced or deleted, or additional constituent elements may be added to each aspect. These modifications can be included in the technical scope of the disclosure.

(1) A pivot assembly bearing device according to a first aspect of the disclosure includes a shaft having an outer peripheral surface; and a rolling bearing fixed to the shaft, and an annular sealing surface axially overlapping with at least a part of an end surface of the rolling bearing is provided on an axially outer side of the rolling bearing, and an oil-repellent film is annularly formed on at least one of the sealing surface and a part of the outer peripheral surface of the shaft located axially outward from the rolling bearing.

The pivot assembly bearing device according to the first aspect of the disclosure includes the rolling bearing fixed to the shaft. The annular sealing surface extending in a radial direction is provided on the axially outer side of the rolling bearing. The sealing surface is provided so as to axially overlap with at least the part of the axial end surface of the rolling bearing. In this way, a labyrinth seal is formed on the axially outer side of the rolling bearing by a gap between the axial end surface of the rolling bearing and the sealing surface, and a gap between an inner peripheral surface or an outer peripheral surface of a member including the sealing surface and a surface (outer peripheral surface of the shaft) opposed thereto, and the like. Further, in the pivot assembly bearing device according to the present aspect, the oil-repellent film is annularly formed on at least one of the sealing surface as described above and the part of the outer peripheral surface of the shaft located axially outward from the rolling bearing.

Here, a phenomenon that base oil constituting the grease enclosed in the rolling bearing as lubricant oozes out through the labyrinth seal is considered. The oozing path of the base oil is considered in such a manner that the base oil is transmitted along the sealing surface and the outer peripheral surface of the shaft defining the gaps forming the labyrinth seal at a position axially outside the rolling bearing. Therefore, in the pivot assembly bearing device according to the present aspect, as described above, the oil-repellent film is annularly formed on at least one of the sealing surface formed on the axially outer side of the rolling bearing and the portion of the outer peripheral surface of the shaft located axially outward from the rolling bearing. In this way, the oil-repellent film for repelling the oil is present on the path along which the base oil of the grease is transmitted. Therefore, the oozing out of the base oil of the grease is suppressed.

Moreover, in the pivot assembly bearing device according to the present aspect, the oil-repellent film can be easily formed, unlike the conventional pivot assembly bearing device. That is, when the oil-repellent film is provided on the annular sealing surface, oil-repellent agent is applied on the sealing surface in a horizontal state, and thus, it is possible to prevent the oil-repellent agent from dripping. When the oil-repellent film is provided on the outer peripheral surface of the shaft, for example, the sealing surface radially extending from the outer peripheral surface of the shaft positioned between the oil-repellent film and the rolling bearing can be included. In this case, since the oil-repellent agent applied on the outer peripheral surface of the shaft is stopped at the sealing surface as described above even when the oil-repellent agent falls down, the inside of the rolling bearing is not contaminated. Therefore, the oil-repellent agent can be applied without any problem and the oil-repellent film can be easily formed, so that the entire pivot assembly bearing device can be easily manufactured.

(2) A second aspect of the present disclosure is characterized in that, in the first aspect, the pivot assembly bearing device further includes an annular sealing plate fixed to the outer peripheral surface of the shaft, and the sealing surface is at least one of a surface of the annular sealing plate on a rolling bearing side and a surface of the annular sealing plate on an opposite side of the rolling bearing.

In the pivot assembly bearing device according to the first aspect, the sealing surface may be each of the radially extending surfaces of the annular sealing plate fixed to the outer peripheral surface of the shaft, located on rolling bearing side and on the opposite side of the rolling bearing. In this case, the annular sealing plate extends radially from the outer peripheral surface of the shaft, and two principal surfaces of the annular sealing plate, that is, the surface on the rolling bearing side and the surface on the opposite side thereof correspond to the sealing surface, respectively. Therefore, a labyrinth seal is formed on the axially outer side of the rolling bearing by a gap between the axial end surface of the rolling bearing and the surface (sealing surface) of the annular sealing plate facing the rolling bearing, and a gap between the outer peripheral surface of the annular sealing plate and a member opposed thereto. Also, when the oil-repellent film is provided on the outer peripheral surface of the shaft, it is preferable that the oil-repellent film is formed at a position axially outside the annular sealing plate. Even in the concrete configuration as described above, the pivot assembly bearing device according to the present aspect can be easily manufactured while suppressing the oozing out of the grease to the outside.

(3) A third aspect of the present disclosure is characterized in that in the first aspect, the pivot assembly bearing device further includes a housing to which an outer ring of the rolling bearing is fixed; and an annular sealing plate fixed to the outer peripheral surface of the shaft or an inner peripheral surface of the housing, and the sealing surface is at least one of surfaces of the annular sealing plate located on a rolling bearing side and on an opposite side of the rolling bearing.

In the pivot assembly bearing device according to the first aspect, the outer ring of the rolling bearing may be fixed to the housing, and the sealing surface may be each of the surfaces, on the rolling bearing side and on the opposite side, of an annular sealing plate fixed to the outer peripheral surface of the shaft or the inner peripheral surface of the housing. In this case, the annular sealing plate extends radially from the inner peripheral surface of the housing or the outer peripheral surface of the shaft, and two principal surfaces of the annular sealing plate, that is, the surface on the rolling bearing side and the surface on the opposite side thereof define the sealing surface, respectively. Therefore, a labyrinth seal is formed on the axially outer side of the rolling bearing by a gap between the axial end surface of the rolling bearing and the surface (sealing surface), on the rolling bearing side, of the annular sealing plate and a gap between the peripheral surface (inner peripheral surface or outer peripheral surface) of the annular sealing plate and the outer peripheral surface of the shaft or the inner peripheral surface of the housing and the like. Also, when the oil-repellent film is provided on the outer peripheral surface of the shaft, it is preferable that the oil-repellent film is provided at a position axially outside the annular sealing plate. Even with the concrete configuration as described above, the pivot assembly bearing device according to the present aspect can be easily manufactured while suppressing the oozing out of the grease to the outside.

(4) A fourth aspect of the present disclosure is characterized in that in the second aspect, the oil-repellent film is formed on the at least one of the surface of the annular sealing plate on the rolling bearing side, and the surface of the annular sealing plate on the opposite side of the rolling bearing.

In the pivot assembly bearing device according to the second aspect, the oil-repellent film may be formed on at least one of the surface of the annular sealing plate on the rolling bearing side, and the surface of the annular sealing plate on the opposite side. In this case, the oil-repellent film can be formed on at least one of the two principal surfaces (the surface on the rolling bearing side and the surface on the opposite side thereof) of the annular sealing plate corresponding to the sealing surface as described in the second aspect. Here, when the oil-repellent film is formed on the surface, on the rolling bearing side, of the annular sealing plate, it is preferable that the oil-repellent film is formed before the annular sealing plate is attached to the shaft or the housing. In this way, when attaching the annular sealing plate, the oil-repellent film faces axially inward (toward the ball bearing). Therefore, the oil-repellent film does not come into contact with a jig or the like and there is no problem that the oil-repellent film is peeled off. Also, when the oil-repellent film is formed on the surface of the annular sealing plate on the opposite side to the rolling bearing, it is preferable that the oil-repellent film is formed after the annular sealing plate is attached to the shaft or the housing. In this way, since the applied surface faces axially outward, the oil-repellent agent is easily applied. Thus, the oil-repellent film can be easily formed regardless of which side of the two principal surfaces of the annular sealing plate the oil-repellent film is formed on.

Here, in the present configuration, a phenomenon that base oil constituting grease enclosed in the rolling bearing oozes out through the labyrinth seal is considered. Then, the oozing path can be considered in which the base oil passes through the inner peripheral surface or the outer peripheral surface from the surface of the annular sealing plate on the rolling bearing side, and is transmitted to the surface of the annular sealing plate on the side opposite to the rolling bearing. Therefore, when the oil-repellent film is formed on both of the two principal surfaces of the annular sealing plate, the oil-repellent film is formed at two places in the oozing path of the base oil of the grease. In this way, the oil-repellent film for repelling the base oil of the grease is formed in duplicate, so that the oozing out of the base oil of the grease is more effectively suppressed. Further, when the oil-repellent film is formed on the outer peripheral surface of the shaft, it is preferable that the annular sealing plate is fixed to the outer peripheral surface of the shaft at the axial position on the rolling bearing side than the formation position of the oil-repellent film, and the oil-repellent film is also formed on one or both of the two principal surfaces of the annular sealing plate. In this case, the oil-repellent film is present in at least two places on the oozing path in which the base oil of the grease is transmitted from the surface of the annular sealing plate on the rolling bearing side to the surface on the opposite side and is further transmitted from there to the outer peripheral surface of the shaft. Therefore, also with such a configuration, the oozing out of the base oil of the grease is more effectively suppressed.

(5) A fifth aspect of the present disclosure is characterized in that in the third aspect, the annular sealing plate includes two or more annular sealing plates provided at intervals in an axial direction, and the annular sealing plates are alternately fixed to the outer peripheral surface of the shaft and the inner peripheral surface of the housing.

In this case, a plurality of sealing surfaces is the surfaces of the two or more annular sealing plates, the surfaces being on the rolling bearing side and on the opposite side of the rolling bearing.

Further, a labyrinth seal is formed by a gap between the surface (sealing surface) of the annular sealing plate closest to the rolling bearing on the rolling bearing side and the axial end surface of the rolling bearing, a gap between the peripheral surface of the annular sealing plate closest to the rolling bearing and the outer peripheral surface of the shaft or the inner peripheral surface of the housing, a gap between the annular sealing plate closest to the rolling bearing and the annular sealing plate secondly closest to the rolling bearing, and a gap between the peripheral surface of the annular sealing plate secondly closest to the rolling bearing and the outer peripheral surface of the shaft or the inner peripheral surface of the housing. Also, when the oil-repellent film is provided on the outer peripheral surface of the shaft, the oil-repellent film is formed at a position axially outside the annular sealing plate fixed to the outer peripheral surface of the shaft. Also in the above-described configuration having a plurality of annular sealing plates, the pivot assembly bearing device according to the present aspect can be easily manufactured while suppressing the oozing out of the grease to the outside.

(6) A sixth aspect of the present disclosure is characterized in that in the fifth aspect, the sealing surface includes a plurality of sealing surfaces, the plurality of sealing surfaces being the surfaces of the two or more annular sealing plate on the rolling bearing side and on the opposite side of the rolling bearing, and the oil-repellent film is formed on at least one of the plurality of sealing surfaces.

In the pivot assembly bearing device according to the fifth aspect, the oil-repellent film may be formed on at least one of the plurality of sealing surfaces formed on the surfaces, on the rolling bearing side, of the two or more annular sealing plates and the surfaces on the opposite side thereof. Here, for the same reason as described in the above fourth aspect, when the oil-repellent film is formed on the surface of any annular sealing plate on the rolling bearing side, it is preferable that the oil-repellent film is formed before the annular sealing plate is attached to the shaft or the housing. Further, when the oil-repellent film is formed on the surface of any annular sealing plate on the opposite side to the rolling bearing, it is preferable that the oil-repellent film is formed after the annular sealing plate is attached to the shaft or the housing. With such a method, the oil-repellent film can be formed in order from the annular sealing plate closer to the rolling bearing. In this manner, the oil-repellent film can be easily formed regardless of which sealing surface the oil-repellent film is formed on.

The labyrinth seal having such a configuration is formed by a plurality of gaps as described in the above fifth aspect. Thus, the oil-repellent film can be formed at appropriate positions selected from a plurality of sealing surfaces and the outer peripheral surface of the shaft so that the oozing path of the base oil of the grease passing through the surfaces defining each gap is specified and the oil-repellent film is formed in at least one place on each path. In this way, the oil-repellent film is formed at an appropriate position according to the oozing path, so that the oozing out of the base oil of the grease is effectively suppressed. Moreover, when the formation position of the oil-repellent film is selected so that the oil-repellent film is formed in two or more places on the specified path, the oozing out of the base oil of the grease is more effectively suppressed.

(7) A seventh aspect of the present disclosure is characterized in that in the first aspect, a flange portion is provided to the shaft on an axial end side thereof, and the sealing surface is a surface of the flange portion, the surface of the flange facing the rolling bearing.

In the pivot assembly bearing device according to the first aspect, the sealing surface may be the surface of the flange portion provided on one axial end side of the shaft and facing the rolling bearing. The flange portion provided on one axial end side of the shaft extends to protrude radially outward from the outer peripheral surface of the other portion of the shaft. The sealing surface described in the first aspect is the surface of such flange portion facing the rolling bearing.

Therefore, a labyrinth seal is formed on the axially outer side of the rolling bearing by a gap between the axial end surface of the rolling bearing and the surface (sealing surface) of the flange portion facing the rolling bearing. Thus, when the oil-repellent film is formed on the sealing surface of the flange portion, the oil-repellent film is present on the oozing path of the base oil of the grease. Since the oil-repellent film is provided on the sealing surface facing the rolling bearing, the oil-repellent film should be formed before the rolling bearing is attached to the shaft. However, since a gap is provided between the end surface of the rolling bearing after being attached and the sealing surface, the rolling bearing does not come into contact with the oil-repellent film formed on the flange portion. Therefore, the rolling bearing is attached without peeling off the oil-repellent film. In this manner, even when the sealing surface is the flange portion of the shaft, the pivot assembly bearing device can be easily manufactured while suppressing the oozing out of the grease to the outside.

(8) An eighth aspect of the present disclosure is characterized in that in the first aspect, an annular stepped portion or an annular groove recessed from surrounding portions is provided on the at least one of the sealing surface and the part of the outer peripheral surface of the shaft located axially outward from the rolling bearing, and the oil-repellent film is formed in the annular stepped portion or the annular groove.

In the pivot assembly bearing device according to the first aspect, the oil-repellent film may be formed in the annular stepped portion or the annular groove recessed from surrounding portions. In the pivot assembly bearing device according to the present aspect, the annular stepped portion or the annular groove is provided on the sealing surface or the outer peripheral surface of the shaft, and the oil-repellent film is formed in the annular stepped portion or the annular groove recessed from the surrounding portions. In this way, the applied oil-repellent agent is prevented from spreading to an unintended portion, so that the oil-repellent film is easily formed at an intended portion. Further, it is preferable that the depth of the stepped portion or the groove is larger than the film thickness of the oil-repellent film formed thereon. In this manner, since the oil-repellent film is formed at a position lower than the surrounding surface, the peeling of the oil-repellent film due to the contact with other parts or a jig during assembly is prevented, and the oil-repellent film is more easily formed. Moreover, as described in the fourth aspect, when the oil-repellent film is provided on both of the two principal surfaces of the annular sealing plate, it is preferable that the position where the oil-repellent film is provided, that is, the position where the stepped portion or the groove is provided is shifted in the radial direction between the two principal surfaces. When the stepped portion or the groove is formed at the same position in the radial direction on both principal surfaces, the thickness of the annular sealing plate decreases by twice the depth of the stepped portion or the groove, and thus, the rigidity may become insufficient. On the other hand, if a sufficient thickness is provided at a position where the stepped portion or the groove overlaps on both principal surfaces in order to avoid the lack of rigidity, other parts will become unnecessarily thick. When the position of the stepped portion or the groove is shifted in the radial direction between the two principal surfaces, the lack of rigidity of the annular sealing plate is prevented, and an unnecessary increase in the thickness of the annular sealing plate is suppressed.

(9) A ninth aspect of the present disclosure is characterized in that in the eighth aspect, the annular stepped portion or the annular groove is provided on the sealing surface In the pivot assembly bearing device according to the eighth aspect, an annular stepped portion or an annular groove may be formed in the sealing surface. For example, only one stepped portion or groove may be formed in the sealing surface, or a plurality of stepped portions or grooves may be provided separated apart in the radial direction of the sealing surface. Further, when the oil-repellent film is formed on the sealing surface, the oil-repellent film may be formed over the surface of the stepped portion recessed from the surrounding portion or the bottom surface of the groove and the surrounding portion, and also the oil-repellent film may be formed over the plurality of stepped portions or grooves. Even in this case, the oil-repellent film can be easily formed by keeping the sealing surface in a horizontal position during the application of the oil-repellent agent.

Since the disclosure has the above-described configuration, it is possible to provide the pivot assembly bearing device capable to suppress the oozing of grease to the outside and easy to be manufactured.

What is claimed is:
1. A pivot assembly bearing device comprising:
a shaft having an outer peripheral surface; and
a rolling bearing fixed to the shaft,
wherein an annular sealing surface axially overlapping with at least a part of an end surface of the rolling bearing is provided on an axially outer side of the rolling bearing, and wherein an oil-repellent film is annularly formed on at least one of the sealing surface and a part of the outer peripheral surface of the shaft located axially outward from the rolling bearing.

2. The pivot assembly bearing device according to claim 1, further comprising:
an annular sealing plate fixed to the outer peripheral surface of the shaft,
wherein the sealing surface is at least one of a surface of the annular sealing plate on a rolling bearing side and a surface of the annular sealing plate on an opposite side of the rolling bearing.

3. The pivot assembly bearing device according to claim 2,
wherein the oil-repellent film is formed on the at least one of the surface of the annular sealing plate on the rolling bearing side, and the surface of the annular sealing plate on the opposite side of the rolling bearing.

4. The pivot assembly bearing device according to claim 1, further comprising:
a housing to which an outer ring of the rolling bearing is fixed; and
an annular sealing plate fixed to the outer peripheral surface of the shaft or an inner peripheral surface of the housing,
wherein the sealing surface is at least one of a surface of the annular sealing plate on a rolling bearing side, and a surface of the annular sealing plate on an opposite side of the rolling bearing.

5. The pivot assembly bearing device according to claim 4,
wherein the annular sealing plate includes two or more annular sealing plates spaced apart in an axial direction, and
wherein the annular sealing plates are alternately fixed to the outer peripheral surface of the shaft and the inner peripheral surface of the housing.

6. The pivot assembly bearing device according to claim 5,
wherein the sealing surface includes a plurality of sealing surfaces,
wherein the plurality of sealing surfaces is respectively corresponding surfaces of the two or more annular sealing plates on the rolling bearing side and on the opposite side of the rolling bearing, and
wherein the oil-repellent film is formed on at least one of the plurality of sealing surfaces.

7. The pivot assembly bearing device according to claim 1,
wherein a flange portion is provided to an axial end side of the shaft, and
wherein the sealing surface is a surface of the flange portion, the surface of the flange facing the rolling bearing.

8. The pivot assembly bearing device according to claim 1,
wherein an annular stepped portion or an annular groove which is recessed from surrounding portions is provided on the at least one of the sealing surface and the part of the outer peripheral surface of the shaft located axially outward from the rolling bearing, and
wherein the oil-repellent film is formed in the annular stepped portion or the annular groove.

9. The pivot assembly bearing device according to claim 8,
wherein the annular stepped portion or the annular groove is provided on the sealing surface.

* * * * *